United States Patent [19]
Gross

[11] Patent Number: 5,536,126
[45] Date of Patent: Jul. 16, 1996

[54] ASSEMBLY WITH SOLID STATE, PHASE TRANSFORMABLE LOCKING FASTENER

[75] Inventor: Peter M. Gross, Torrance, Calif.

[73] Assignee: Hughes Aircraft Company, Los Angeles, Calif.

[21] Appl. No.: 258,161

[22] Filed: Jun. 10, 1994

[51] Int. Cl.$^6$ .............................. B23P 11/02; F16B 21/00
[52] U.S. Cl. .............................. 411/411; 411/15; 411/530; 411/909
[58] Field of Search .............................. 411/15, 360, 411, 411/424, 427, 436, 530, 433, 901, 902, 909, 914

[56] References Cited

U.S. PATENT DOCUMENTS

| | | | |
|---|---|---|---|
| 2,585,304 | 2/1952 | Evans | 411/411 |
| 3,416,823 | 12/1968 | Auer | 411/909 |
| 3,913,444 | 10/1975 | Otte | 411/909 |
| 4,420,918 | 12/1983 | Arnoux | 411/411 |
| 4,619,568 | 10/1986 | Carstensen | 411/909 |
| 4,880,343 | 11/1989 | Matsumoto | 411/909 |
| 5,133,631 | 7/1992 | Beach . | |
| 5,265,456 | 11/1993 | Kennedy . | |
| 5,366,331 | 11/1994 | Erbes | 411/909 |

FOREIGN PATENT DOCUMENTS

| | | | |
|---|---|---|---|
| 839692 | 5/1952 | Germany | 411/411 |

OTHER PUBLICATIONS

Rosan, Inc., "Slimsert®" Product Brochure, 3 pages (1963).
T. Tadaki et al., "Shape Memory Alloys", *Ann. Rev. Mater. Sci.*, pp. 25–45 (1988).
Tom Borden, "Shape Memory Alloy Fastener Rings," 22 page unpublished preprint (May 1990).
Edward R. Buchanan et al., "Fatigue Strength Enhancement Using Shape Memory Alloy Bushings", *ASTM Reprint 90–GR–316*, presented Jul. 1990.
Raychem Corp., Brochure on "Unilok™ Rings" (May 1991).
Raychem Corp., UniLok™ rings Ordering Information, 1 page brochure (Jul. 1991).
Tom Borden, "Shape–Memory Alloys: Forming a Tight Fit", *Mechanical Engineering*, pp. 66–72 (Oct. 1991).
Tom Borden, "Shaping Up Fastener Rings", *Machine Design*, 4 page reprint (Oct. 1991).
TiNi Alloy Company, "Introduction to Shape Memory Alloys", Thin Film Shape Memory Alloys, TiNi Pneumatic Valves, Lightweight Memory–Metal Pin Puller, and Frangibolt™. Package of information received from TiNi Alloy Company by the inventor on about Feb. 8, 1992.
Raychem Corp., UniLok™ Nominal Material Properties, 1 page brochure (Jul. 1991).
Raychem Corp., UniLok™ Available Product Listing, 2 page brochure (Mar. 1993).
Raychem Corp., UniLok™ Available Product Listing, 4 page brochure (Mar. 1993).

*Primary Examiner*—Flemming Saether
*Attorney, Agent, or Firm*—Terje Gudmestad; W. K. Denson-Low

[57] ABSTRACT

A locking assembly is formed of a first article (40), a second article (44), and a locking fastener (46) positioned between the two articles and made of a shape memory alloy material. The locking fastener (46) is dimensioned to have a first shape below the transformation temperature wherein the first article (40) and the second article (44) are not locked together, and a second shape above the transformation temperature wherein the first article (40) and the second article (44) are locked together by the locking fastener (46). In one form, the first article (40) has a cylindrical bore (42) therein, the second article (44) is a cylinder that fits within the bore (42), and the locking fastener (46) is a helical coil or an annular ring having a radial slot therethrough, placed between the cylinder and the wall of the bore.

19 Claims, 3 Drawing Sheets

ASSEMBLY WITH SOLID STATE, PHASE
TRANSFORMABLE LOCKING FASTENER

BACKGROUND OF THE INVENTION

This invention relates to the fastening of articles together into an assembly, and, in particular, to such an assembly wherein the fastener is operable via a solid state phase transformation.

Nearly all structures require the joining and assembly of multiple individual articles. The articles can be joined permanently (e.g., welding, soldering, adhesive bonding), semipermanently (e.g., removable fasteners), or easily separably (e.g., clamps, mechanical engagements). The present invention relates to an assembly made with a permanent or semipermanent fastener.

Various types of removable fastening techniques are available, such as screws, bolts, some types of rivets, and the like. While widely used and operable in many circumstances, available semipermanent fasteners have drawbacks in some specific applications. When joining articles made of particular materials such as magnesium, nonmetallic composites, and honeycomb structures, care must be taken that the fastener does not damage the article. For example, if the fastener scratches a coated magnesium article, the article may quickly begin to corrode in service at the scratched location. This corroded location may not be readily visible or accessible, as where it is within a bore through which the fastener fits. The result is a structure subject to an unexpected, undetected, accelerated failure.

An alternative approach useful in some situations, typically where a first article has a bore therein and a second article fits tightly within the bore, is shrink fitting. The fastening effect is based upon a frictional engagement between the articles, so that there is little likelihood of scratching and also little opportunity for corrosive agents to penetrate into the joint. In this approach, the first article is heated or the second article is cooled, or both, so that there is a clearance between the second article and the bore due to thermal expansion. The second article is inserted into the bore, and the two articles are allowed to thermally equilibrate to lock them together. The temperature difference that is required to form a joint by this approach is relatively large, inasmuch as thermal expansion coefficients are measured in parts per million per degree.

In theory, the two articles may later be separated by reversing this process. The first article is heated from its outside surface until it expands sufficiently to permit the first article to be removed from the bore. This separation technique is unreliable, because the second article is also heated and expands to fit the bore. The articles can sometimes be separated, but often cannot be separated.

There is a need for an improved technique for fastening two or more articles together, which overcomes the shortcomings of existing approaches. The present invention fulfills this need, and further provides related advantages.

SUMMARY OF THE INVENTION

The present invention provides an approach for fastening two or more articles together with a locking fastener. The locking fastener cannot scratch or otherwise cut into the articles being joined, thereby avoiding the creation of corrosion sites and the like. Fastening is achieved with a relatively small temperature change. The fastening process is reversible, so that the articles can later be separated when desired.

In accordance with the invention, a locking assembly comprises a first article, a second article, and a locking fastener made of a shape memory alloy (SMA) positioned between the first article and the second article. The locking fastener has a first shape wherein the first article and the second article are not locked together, and a second shape wherein the first article and the second article are locked together. Existing shape memory alloys can be used to form the locking fastener. The first shape is preferably attained when the fastener is at a temperature below a transformation temperature of the shape memory material, and the second shape is preferably attained when the fastener is at a temperature above the transformation temperature of the shape memory material.

The fastener is manufactured above its transformation temperature to the required second shape, and then formed to the first shape, as by winding on a mandrel in a preferred embodiment, at a temperature below the transformation temperature. The articles are fastened together by fitting the articles and the locking fastener together with the locking fastener below the transformation temperature. The transformation temperature is desirably slightly below ambient temperature, or other minimum service temperature of the assembly. The assembly is then heated to a temperature above the transformation temperature, so that the locking fastener changes shape to (or at least toward) its second shape to lock the articles together. The fastener may not be able to return fully to its second shape, as it can be constrained in its shape change by interference with the articles. This is acceptable in the operation of the present invention, inasmuch as an inability to return fully to the second shape will result in frictional locking forces serving to lock the articles together. Disassembly can be achieved by reversing the process.

The approach of the invention is particularly useful where the first article has a bore therein, and the second article is to be locked within the bore. Locking fasteners in the form of a helical coil or a slotted annulus are suitable for this application.

The approach of the invention provides a locked structure. The fastening is based upon the friction between the locking fastener and the two articles in some configurations, or a combination of friction and a keyed engagement in other configurations. The amount of force that can be exerted by the fastener on the articles is limited by shape change of the locking fastener, so that it cannot damage the articles under most conditions.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

FIG. 5 is a plan view of another embodiment of a locking fastener; and

DETAILED DESCRIPTION OF THE INVENTION

Figure 1:
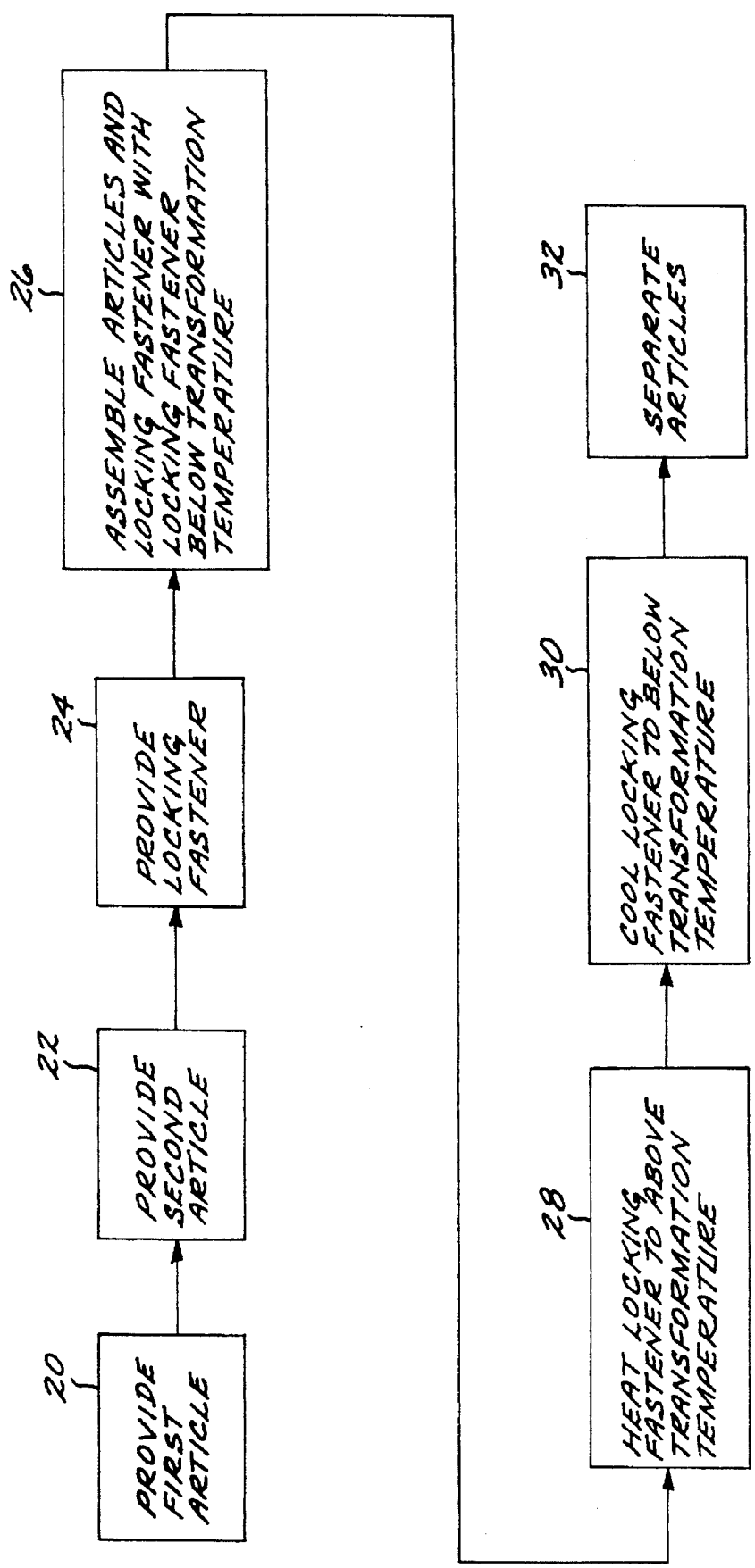
FIG. 1 is a block diagram of a process for practicing the invention.
Figure 2:
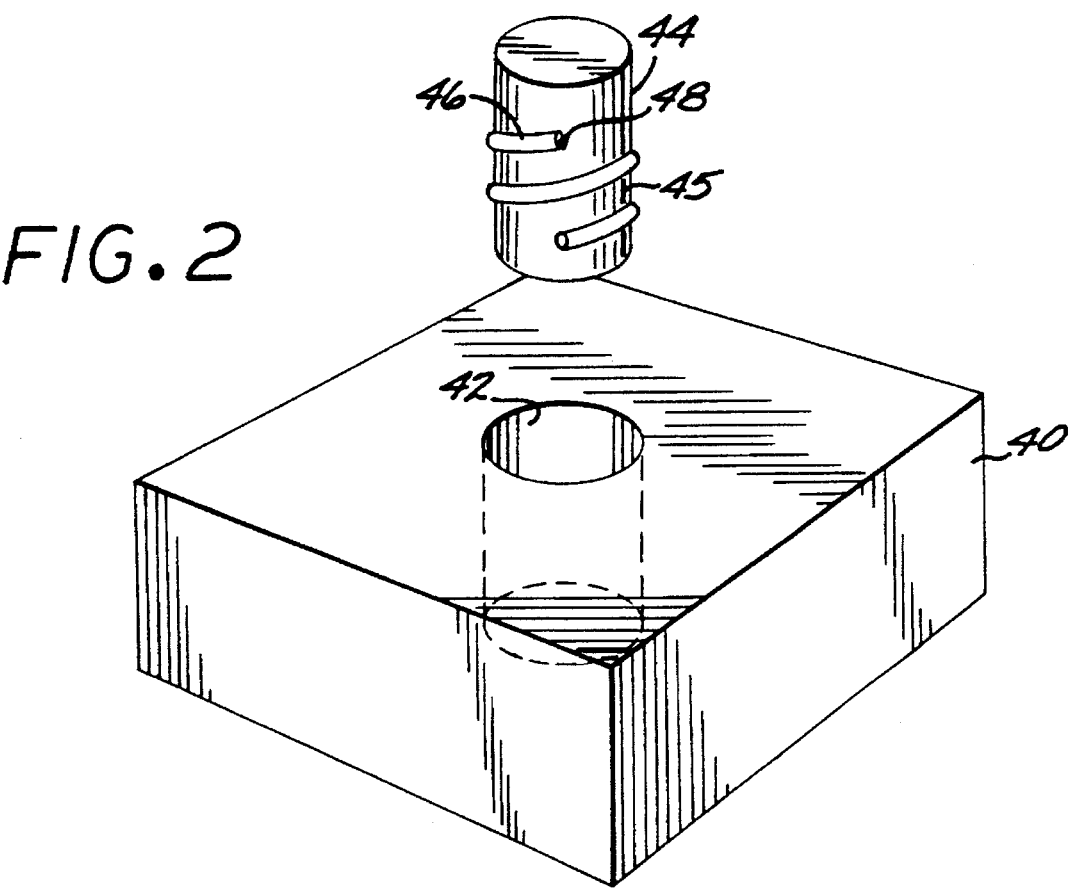
FIG. 2 is a perspective view of two articles and one embodiment of a locking fastener, prior to assembly, with a portion of the structure shown in phantom view.
Figure 3:
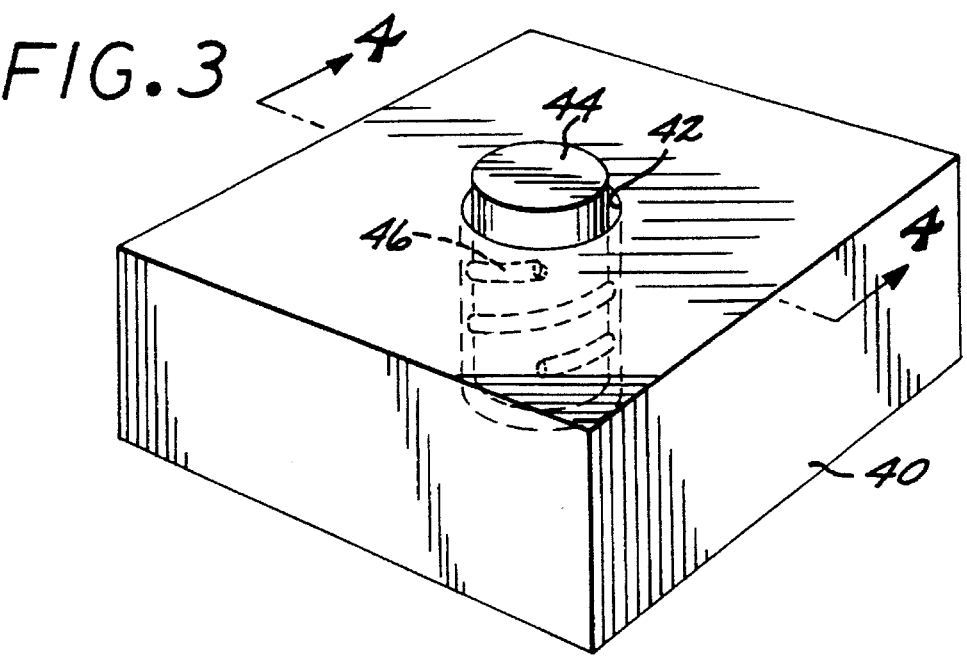
FIG. 3 is a perspective view of the two articles and locking fastener of FIG. 2, after assembly, with a portion of the structure shown in phantom view.

FIG. 1 is a block flow diagram for practicing the approach of the invention, and FIGS. 2–5 show one embodiment of the structure at various stages of assembly. Referring to FIG. 1, a first article is provided, numeral 20. The first article 40 is depicted in FIG. 2 as being a simple block form, but it may be of any operable form. In the preferred form of the invention, the first article 40 includes a cylindrical bore 42.

A second article 44 is provided, numeral 22. The second article 44 is depicted as a cylinder having a cylindrical diameter less than that of the cylindrical bore. The second article may permit further structure to be fastened to it, such as with an internally threaded bore. The second article 44 fits within the bore 42 of the first article 40, with a clearance between the second article 44 and the interior wall of the bore 42. The clearance must be sufficiently large to receive the locking fastener between the first article 40 and the second article 44, as will be described subsequently. The second article 44 may also have a helical groove 45 to receive the fastener in its nonlocking state.

The first article 40 and the second article 44 may be any two materials that are to be assembled and joined by the approach of the invention. However, the present approach is most beneficially utilized when one or both of the articles are made of a material that may be difficult or impossible to join by conventional techniques without damaging the articles. Examples of the types of materials that may be most advantageously joined by this approach include magnesium, magnesium alloys, nonmetallic composite materials, honeycomb articles, castings, glass, ceramics, plastics, and moldings, but the invention is not limited to such materials.

A locking fastener 46 is provided, numeral 24. The locking fastener 46 is illustrated in FIG. 2 in one of its preferred forms for use with the preferred forms of the first article 40 and the second article 44. In this form, the locking fastener 46 is also sometimes termed a locking insert, because it is inserted between the first and second articles. The locking fastener 46 is formed as a helical coil that overlies the second article 44. The helical coil locking fastener 46 is preferably fastened at one location along its length to the second article 44, as by a spot weld 48 during subsequent assembly. The spot weld constrains the helical movement of the helical coil during subsequent processing and service. Other techniques can also be used to constrain this movement, such as appropriate surface roughening of the articles or the locking fastener, or providing a helical groove in either the first article or the second article (as also illustrated in FIGS. 2–5).

The locking fastener 46 is made of a shape memory alloy (SMA) material that exhibits the shape memory effect (SME). Such materials are well known in the art for use in other applications. The technical background of shape memory alloys and the shape memory effect are discussed, for example, in T. Tadaki et al., "Shape Memory Alloys", *Ann Rev Mater. Sci*, vol. 18, pages 25–45 (1988). Some examples of operable shape memory alloys include Ti, 49–51% Ni; Ni, 36–38% Al; Cu, 38.5–41.5% Zn; Cu, 28–29% Al, 3–4% Ni; and Fe, 25% Pt (compositions in weight percent). Other SMA materials are known. Each SMA material has a SME transformation temperature (or temperature range) that is a characteristic of the material.

The material chosen for fabrication of the locking fastener 46 is selected in part based on the transformation temperature for that alloy. The transformation temperature of the SMA used in the fastener must be below the service (use) temperature of the assembly of the articles and fastener, but not so far below that the assembly process is not practical. For example, if the locked-together assembly is to be used at ambient temperature, the shape memory alloy used in the fastener must have a transformation temperature below ambient temperature. A number of the commercially most important SMA materials are available commercially from Raychem Corp., Menlo Park, Calif.

The shape memory alloys are characterized by a high-temperature state, sometimes termed the austenitic state. The fastener 46 is fabricated with the SMA the high-temperature state. Upon cooling below a transformation temperature which is characteristic of the particular SMA material, the material transforms to a martensitic state. The material can be deformed when in the low-temperature, martensitic state so that, in this case, the fastener does not lock the articles together. The shape memory alloy is a solid material both above and below the transformation temperature.

Upon heating from the low-temperature state back to the high-temperature state, the material returns (or attempts to return) to the same shape it had when fabricated in the high-temperature state (sometimes termed the "memory shape"). Since the shape of the fastener in the high-temperature state is selected to lock the articles together, upon heating to the high-temperature state from the low-temperature state the articles will become locked together through the shape change of the fastener.

(This brief discussion of the shape memory effect is necessarily of a basic nature and is presented only by way of background for the invention. Many complexities such as hysteresis, two-way effects, etc. can occur in specific alloy systems and modes of deformation, such as discussed in the Tadaki et al. article. These complexities do not alter the operability of the invention as based upon the basic character of the effect).

Desirably, the shape memory alloy selected for use in the fastener 46 undergoes a solid state phase transformation accompanied by a specific shape change of at least one part per hundred upon heating through the transformation temperature. The volume change should be at least this amount for the locking fastener to be effective, given conventional tolerances to which the articles and the locking fastener can be manufactured.

The bore 42, second article 44, and locking fastener 46 are configured and dimensioned to have a first state below the transformation temperature of the shape memory alloy wherein the first article and the second article are not locked together, and a second shape above the transformation temperature wherein the first article and the second article are locked together by the locking fastener. The fastener 46 is fabricated at a temperature above the transformation temperature to have the second shape that will lock the articles 44 and 46 together. It is then cooled to below the transformation temperature and deformed into the first shape. In the preferred approach wherein the locking fastener is a spiral coil, the deformation to the first shape can be accomplished by winding the piece of shape memory alloy around a mandrel.

Figure 4:
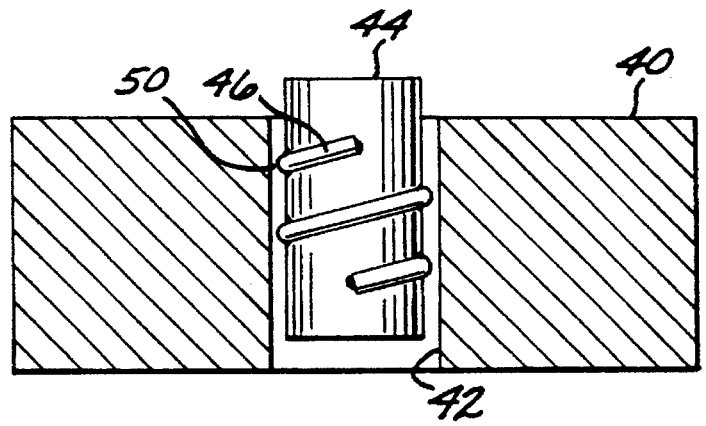
FIG. 4 is a schematic side sectional view of the assembly of FIG. 3, taken on line 4—4, before heating.
Figure 5:
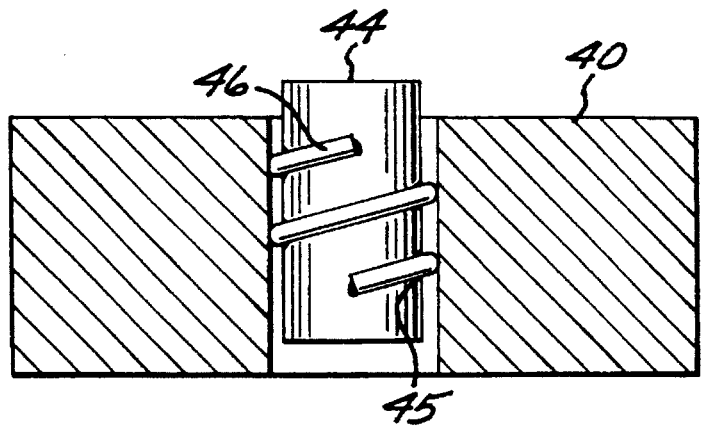
FIG. 5 is a schematic side sectional view of the assembly of FIG. 3, taken on line 4—4, after heating.

The second article 44, with the locking fastener 46 in place, is assembled into the bore 42 with the fastener 46 in the first shape and below the transition temperature of the shape memory alloy selected for the locking fastener 46, numeral 26. For example, where the transformation temperature is below ambient temperature, the locking fastener 46 is cooled to below ambient temperature. Optionally, either the first article 40, the second article 44, or both may also be cooled below the transformation temperature to permit a longer time for the assembly to be completed. During assembly, the helical fastener 46 may be deformed to lie within the helical groove 45, if provided, and one end or one intermediate location of the helical fastener 46 is fixed to the article 44, as with the spot weld 48. FIG. 4 shows the assembly at this point of the procedure. There remains a small clearance 50 between the locking fastener 46 and the bore 42.

Once assembled, locking fastener 46, and, where cooled, the first article 40 and second article 44, are heated to a temperature above the transformation temperature, numeral 28. The temperature to which the articles and fastener are heated is typically the service temperature, such as ambient temperature. The locking fastener 46 changes shape back towards the second shape as the transformation temperature is exceeded. The clearance 50 disappears, and the locking fastener 46 locks the second article 44 to the bore 42 of the first article 40. The first shape is selected to most securely lock the articles together.

It is not necessary or even preferred that the locking fastener 46 actually changes shape exactly and completely back to the first shape when heated. Thus, the fastener may be made substantially oversize to account for any tolerances in the articles. Upon heating to above the transformation temperature, the shape of the locking fastener changes from the first (nonlocking) shape back toward the second (locking) shape. If the second shape is not entirely reached because the presence of the articles constrains the shape change, the stress within the fastener will rise, producing frictional forces that serve to lock the articles together. In many cases, the frictional locking is as effective, or more effective, than a keyed type of locking might be. Both a frictional locking and a keyed locking are acceptable fastening mechanisms for the present approach.

This completes the assembly of the articles.

While cooling and heating may be involved, this process is distinct from shrink fitting in that the thermal expansion of the inserted article is not relied upon for achieving the fastening effect. Thermal expansion is typically in the range of parts per million per degree of temperature change, whereas the material used in the locking fastener 46 achieves a volumetric change of at least one part per hundred within a few degrees of temperature change. Moreover, the present approach utilizes a separate locking fastener 45 between the two articles 40 and 44, whereas no intermediate structure is used in shrink fitting of parts.

The present approach is also distinct from a known fastening approach wherein a ring of a shape memory alloy is prepared and forced over the outside of two concentrically positioned articles that are to be held together. The diameter of the ring is reduced upon heating to above the transformation temperature, effectively shrinking the ring onto the top of the two pieces. In this case, the ring does not fit between the articles, and cannot be used as an intermediate fastener between two such articles unless much more complex geometries are utilized.

Figure 6:
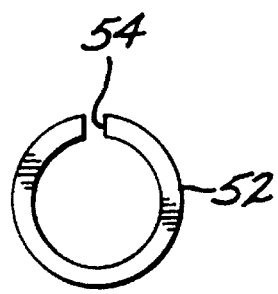
Figure 7:
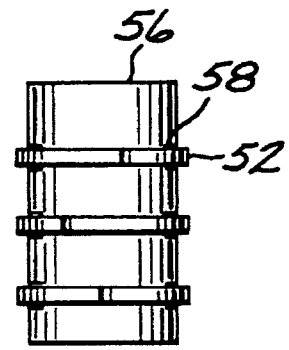
FIG. 7 is an elevational view of the locking fastener of FIG. 6 installed to a second article.

The present approach allows the articles 40 and 44 to be separated in a controlled manner at a later time, as shown in FIG. 1. To separate the articles, the assembly is cooled to a temperature below the transformation temperature, numeral 30. The locking fastener 46 returns toward the first shape that it had prior to heating (step 28), so that the clearance 50 returns (FIG. 4). The articles are thereafter separated, numeral Other configurations of the locking fastener can be utilized, and one such alternative configuration is shown in FIG. 6. A locking fastener 52 is an annular ring having a radial slot 54 therein. A second article 56, FIG. 7, is depicted as being a cylinder comparable with the second article 44 discussed previously. The second article 56 optionally has a circumferential groove 58 to receive the locking fastener 52 therein. As shown in FIG. 7, there is typically provided more than one of the grooves 58 and a locking fastener 52 for each of the grooves 58. The steps of fabricating of the locking fastener 52 in the high-temperature state of the SMA, cooling to below the transformation temperature, deforming the fastener to the nonlocking first state (permitted by the slot 54), assembly of the articles and fastener, and reheating to above the transformation temperature are otherwise comparable to the steps discussed in relation to FIG. 4.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A locking assembly, comprising:

a first article;

a second article; and a locking fastener made of a shape memory alloy positioned between the first article and the second article, the locking fastener having a first shape wherein the first article and the second article are not locked together and a second shape wherein the first article and the second article are locked together by the locking fastener, the locking fastener having a configuration such that the articles are locked together upon heating to above a transformation temperature of the shape memory alloy and unlocked upon subsequent cooling to below the transformation temperature of the shape memory alloy the locking fastener having a shape of a helical coil.

2. The assembly of claim 1, wherein the first article includes a bore therein, and wherein the second article is dimensioned to be received within the bore with the locking fastener therebetween.

3. The assembly of claim 2, wherein the second article is a cylinder, and the bore is cylindrical.

4. The assembly of claim 1, wherein the helical coil having a first end and a second end.

5. The assembly of claim 4, wherein the helical coil is fixed to the second article at one location along the length of the helical coil.

6. The assembly of claim 1, wherein the second article has a groove therein dimensioned to receive the locking fastener therein.

7. The assembly of claim 6, wherein the groove is a helical groove, and the helical coil is received within the helical groove.

8. The assembly of claim 1, wherein at least one of the first article and the second article is made of a material comprising magnesium, a magnesium alloy, glass, ceramic, plastic, a nonmetallic composite material, and a honeycomb material.

9. The assembly of claim 1, wherein the fastener is made of a shape memory alloy material which experiences a shape change of at least one part per hundred upon heating through a transformation temperature between a first state and a second state.

10. A locking assembly, comprising:

a first article having a cylindrical bore therein, the bore having a bore wall with a bore wall diameter;

a cylindrical second article, a cylindrical diameter of the second article being less than the bore wall diameter of the first article; and a locking fastener made of a shape memory alloy positioned between the bore wall and the second article, the locking fastener having a first shape wherein the first article and the second article are not locked together and a second shape wherein the first article and the second article are locked together by the locking fastener, the locking fastener having a shape of a helical coil.

11. The assembly of claim 10, wherein the helical coil having a first end and a second end.

12. The assembly of claim 11, wherein the helical coil is fixed to the second article at one location along the length of the helical coil.

13. The assembly of claim 10, wherein the second article has a groove therein.

14. The assembly of claim 13, wherein the groove is a helical groove, and the helical coil is received within the helical groove.

15. The assembly of claim 10, wherein at least one of the first article and the second article is made of a material comprising magnesium, a magnesium alloy, glass, ceramic, plastic, a nonmetallic composite material, and a honeycomb material.

16. The assembly of claim 10, wherein the fastener is made of a shape memory alloy material which experiences a shape change of at least one part per hundred upon heating through a transformation temperature between a first state and a second state.

17. The assembly of claim 16, wherein the transformation temperature is less than ambient temperature.

18. A method of locking two articles together, comprising the steps of:

providing a first article;

providing a second article;

providing a locking fastener shaped as a helical coil made of a material that undergoes a solid state phase transformation accompanied by a shape change of at least one part per hundred upon heating through a transformation temperature, the locking fastener being dimensioned to have a first shape below the transformation temperature wherein the first article and the second article are not locked together and a second shape above the transformation temperature wherein the first article and the second article are locked together by the locking fastener, the locking fastener having a configuration such that the articles are locked together upon heating above a transformation temperature of the shape memory alloy and unlocked upon subsequent cooling to below the transformation temperature of the shape memory alloy;

placing the locking fastener between the first article and the second article with the locking fastener at a temperature below the transformation temperature; and heating the locking fastener to a temperature above the transformation temperature.

19. The method of claim 18, including the additional steps, after the step of heating, of cooling the locking fastener to a temperature less than the transformation temperature, and separating the first article from the second article.

\* \* \* \* \*